United States Patent [19]
Coutinho

[11] Patent Number: 5,777,769
[45] Date of Patent: Jul. 7, 1998

[54] DEVICE AND METHOD FOR PROVIDING HIGH SPEED DATA TRANSFER THROUGH A DROP LINE OF A POWER LINE CARRIER COMMUNICATION SYSTEM

[75] Inventor: Roy S. Coutinho, Carmel, Ind.

[73] Assignee: Lucent Technologies Inc., Murray Hill, N.J.

[21] Appl. No.: 579,752

[22] Filed: Dec. 28, 1995

[51] Int. Cl.⁶ .......................... H04B 10/00; H04B 10/12
[52] U.S. Cl. ...................... 359/173; 359/171; 340/310.01
[58] Field of Search ........................... 359/162, 171, 359/173, 176, 179, 164, 157; 340/310.01, 310.02

[56] References Cited

U.S. PATENT DOCUMENTS

| | | | |
|---|---|---|---|
| 4,355,303 | 10/1982 | Phillips et al. | 340/310.02 |
| 4,714,912 | 12/1987 | Roberts et al. | 340/310.02 |
| 4,879,762 | 11/1989 | Hanyuda et al. | 359/171 |
| 4,895,426 | 1/1990 | Pihson | 385/24 |
| 5,001,336 | 3/1991 | De la Chapelle | 250/208.2 |
| 5,148,144 | 9/1992 | Sutterlin et al. | 340/310 A |
| 5,251,054 | 10/1993 | Lynn | 359/189 |
| 5,257,006 | 10/1993 | Graham et al. | 340/310 A |
| 5,369,518 | 11/1994 | Aslami et al. | 359/171 |
| 5,581,229 | 12/1996 | Hunt | 340/310.02 |

Primary Examiner—Rafael Bacares

[57] ABSTRACT

A method and device for increasing the bandwidth of a drop line in a power line carrier communication system for facilitating high speed transmission of communication data. The drop line is divided into two sections, each containing both high frequency communication data components and low frequency power components. A high pass filter is provided for passing the high frequency components to a receiver device and a low pass filter is provided for passing the low frequency power components to an electrical system in a residence. The low pass filter is also used for blocking, from the drop line, high frequency noise generated by electrical appliances operating from the electrical system.

10 Claims, 1 Drawing Sheet

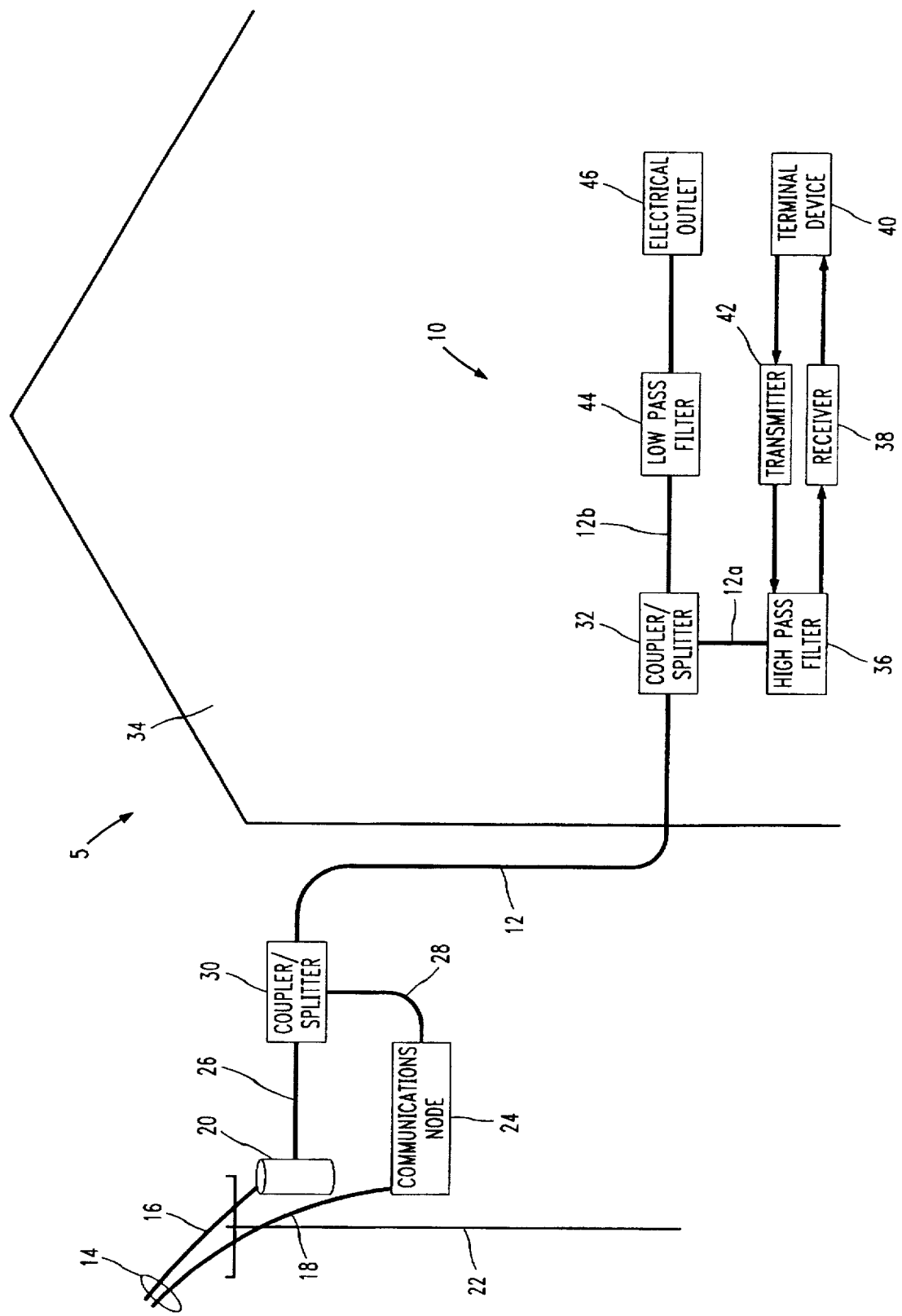

DEVICE AND METHOD FOR PROVIDING HIGH SPEED DATA TRANSFER THROUGH A DROP LINE OF A POWER LINE CARRIER COMMUNICATION SYSTEM

BACKGROUND OF THE INVENTION

I. Field of the Invention

The present invention relates to a communication system wherein communication signals are transmitted to and received from a terminal device over a power drop line. More particularly, the present invention pertains to a device for use in a communication system utilizing an existing power system drop line as a conduit for local communication data. Most particularly, the present invention relates to a device and method for increasing the capacity of communication data that is transmitted and received over a power system drop line.

II. Description of the Related Art

Conventional communication systems typically employ a common fiber optic cable connected between a local communications station and a communications node located, for example, in a residential region or district for carrying a multiplicity of multiplexed digital communication signals to the residential region. The communications node demultiplexes the signals and provides each signal via a fiber optic connection link or a metal cable—connected between the local communications node and each particular residence—to the desired residence based on the address, i.e. the phone number. The requirement of a separate connection, either fiber optic or metal, between the local communications node and each residence adds significant expense to the communication system due, in part, to the labor required for installing the individual links connecting each residence to the communications node.

Many electric company power lines that provide power, via high voltage copper cables or lines, to homes and business employ fiber optic cables, usually located adjacent the copper wires, to transmit and receive distribution and telemetry signals to various power hardware units located downline from a power station. In such power systems, the high voltage power lines typically connect a power station or generator to a local transformer which services a particular residential region. The local transformer converts the high voltage power to a lower voltage which, in turn, is provided to the various residences and/or businesses serviced by each transformer via individual links or drop lines. The distribution and telemetry signals are typically low frequency signals and, thus, only a small portion of the bandwidth capability of the optical fiber—the low frequency range—is used by the power companies. Accordingly, sufficient bandwidth remains available on the existing fibers for communication companies to also transmit and receive thereon communication signals.

As can be expected, the use of already existing fibers, such as power company fibers, by communication companies results in a reduced cost in communication systems because separate optical fibers need not be connected between a local switching station and a communications node. The cost of communication systems can be further reduced if separate connection lines between the individual residences and the local communications node can be eliminated, such as by utilizing the existing drop lines for carrying communication signals. However, due to the presence of high frequency noise on the drop line—which is generated by the activation of various appliances and other devices from the power line in a residence—the transmission of high frequency communication signals over drop lines has heretofore been impractical because the transmission rate of such communication data is hindered by the presence of high frequency noise.

SUMMARY OF THE INVENTION

Accordingly, it would be desirable for a communication system to provide communication signals to local residences or businesses via existing power drop lines so as to eliminate the expense of requiring the added step of separate communication lines connecting each residence and/or business to a local communications node.

The present invention is directed to a device for use in a communication network for increasing the rate of data transmission on a drop line containing a signal having low frequency power components and high frequency data components. The device includes a splitter connected to the drop line for dividing the drop line into a first section and a second section, with each section containing the low frequency power components and the high frequency data components. A first filter connected to the first section is provided for removing the low frequency power components from the first section while passing the high frequency data components to a receiver which receives the high frequency data components for use by a terminal device, such as a computer. A second filter connected to the second section is also provided for removing the high frequency data components from the second section while passing the low frequency power components for use by appliances generating high frequency noise. The second filter also blocks the generated high frequency noise from the second section so that the high frequency noise is not transferred to the drop line.

The method of the present invention is similarly directed to a technique for increasing the rate of data transmission on a drop line in a communication network wherein the drop line contains a signal having low frequency power components and high frequency data components. The method includes dividing the drop line into a first section and a second section, with each section containing the low frequency power components and the high frequency data components, removing the low frequency power components from the first section while passing the high frequency data components, receiving the high frequency data components for use by a terminal device, such as a computer, and removing the high frequency data components from the second section while passing the low frequency power components for use by appliances generating high frequency noise. The method also includes blocking the high frequency noise from the second section so as to avoid transferring the noise to the drop line.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWING

The FIGURE depicts a block diagram of a section of a communications network including a device constructed in accordance with the teachings of the present invention.

DETAILED DESCRIPTION OF THE PRESENTLY PREFERRED EMBODIMENTS

With reference to the FIGURE, a block representation of a local section of a communications network 5 in accordance with an illustrative embodiment of the present invention is there depicted. As shown, the local section 5 supplies a residence 34 or other location, such as a house or business, with power and communication services from a power company and a communications company, respectively, via a common conductor drop line 12. Power and communication data are provided to the residence 34 via a pair of connections or trunks 14 comprising a power line 16, typically a copper cable, carrying high voltage signals which, in the United States, are on the order of 6,000 volts, and a pair of fiber optic cables 18 carrying communication data to and from the local section 5.

As is widely known, power line 16 connects a main power or generator station to a local transformer 20, typically supported on a utility pole 22, which transforms the high voltage to a low voltage signal having a low frequency, i.e. 120 volts at 60 Hz. The local transformer 20 usually services numerous residences or businesses in a general location by supplying the 120 volt power to each residence via separate conductor drop lines such as drop line 12. It will, of course, be recognized by those skilled in the art that in more recently constructed neighborhoods, the local transformer 20 may be pad mounted and links 14 and 16 buried.

In accordance with the present invention, utility pole 22 also supports a local communications node 24 which provides a general location with communication services to and from businesses and/or residences, such as residence 34. Fiber optic cables 18 carry a plurality of high-frequency signals between a local switching network such, for example, as an AT&T 5ESS network switch (not shown) and the communications node 24. The signals carried by cables 18 are multiplexed, as is known in the art, as by frequency shift keying, amplitude shift keying, quadraphase shift keying, time division multplexing, etc. The fiber optic cables 18 may comprise a portion of the power system wherein it may carry power system signals in addition to communication signals, or it may be part of the communications network and used solely as a conduit for communication data. As is known in the art, the communications node 24 demultiplexes the digital information which corresponds to different address locations (phone numbers) corresponding to the various residences serviced by the communications node. The digital information may (for example) correspond to telephone information, computer data intended for or generated by computers, as well as television information such as for digital television applications.

The demultiplexed signals result in a plurality of distinct communication signals, each corresponding to a specific destination location based on an address, such as a phone number, and the signals are then provided to their corresponding destination locations. Of course, if separate optical fibers link cables are provided for connecting each residence to the common communications node 24, the resulting demultiplexed digital signals can be forwarded to their respective destination locations directly over the appropriate fibers. However, and as is more usually the case, for conductor link cables such as copper cables, the digital signals will be first converted to analog signals by the communications node 24, as is known in the art, whereupon the analog signals are then provided to their respective destinations.

As stated above, the need for separate link cables creates an added expense to the communication system not only due to the cost of the cables (either copper cable or fiber optics) but, more importantly, due to the maintenance and installation expenses incurred in providing the multiple cables. Accordingly, if the communications signals can be provided to each residence without the need for a separate link cable, significant expense can be avoided in a communications system.

In an ideal noise-free environment, the analog communication signal can be directly coupled to the drop line 12 by a signal line 28 connected between a coupler/splitter 30 and the communications node 24. Such a connection is possible because of frequency separation between the analog communication signal and the power line signal. Specifically, and as known in the art, the analog communication signal has components at substantially higher frequencies than the power signal components which are at 60 Hz.

The problem associated with this technique, however, is that there is significant high frequency reflective noise present on the drop line 12. Such noise results from the use of electric power, i.e. the use of electrical appliances and the like in the residence 34, as well as from RF signals in the environment which may be received by wiring in the residence which is not RF terminated and which, therefore, serve as antennas for such RF signals (i.e. pick-up noise). The reflective and pick-up noise is within the high frequency range occupied by the communication signals, thus significantly limiting the bandwidth of the drop line 12 and resulting in a slow data transmission rate for communication signals on the drop line.

To overcome this problem, a device 10 is provided for dividing and separating the communication signal from the power signal while preventing reflective high frequency noise from contaminating drop line 12. Device 10 includes a second coupler/splitter 32 which divides the drop line into two separate lines 12a and 12b, both of which contain the same signal components, i.e. power and communication components. The coupler/splitter 32 is, preferably, located in or proximate the residence 34 which is being supplied with power and communication services. Line 12a is connected to a high pass filter 36 that provides for and allows the passing of the high frequency components and specifically the frequency components containing the communication signal information which, in turn, is provided to a receiver 38 for demodulation. It should be noted that the high frequency components passed by filter 36 may contain information intended for other locations or residences. However, receiver 38 will demodulate the resulting signal, according to a corresponding carrier frequency, for example, to obtain the information intended for the particular residence or line. The resulting signal is provided to a terminal device 40 such as a computer, telephone or facsimile machine. In the case of a two-way terminal device, e.g. a telephone, facsimile machine, computer, etc., an outgoing signal generated by the terminal device 40 is input to a transmitter 42 for modulating a carrier signal, as is known in the art, and the modulated signal is applied to the high pass filter 36 for filtering out any low frequency components, such as low frequency noise. The resulting outgoing signal is connected to the coupler/splitter 32 via line 12a, and then provided to drop line 12 and removed therefrom by the first coupler/splitter 30 which directs the outgoing signal to the communications node 24 for multiplexing with other outgoing signals and for transmission in the communication system 5.

The power components of the signal carried on the drop line 12 are supplied to the power circuitry in the residence 34 via line 12b. The high frequency components, i.e. the communications signal components, are removed therefrom via a low pass filter 44 which allows the 60 Hz power signals to pass therethrough. The resulting power signal is supplied to the multiple electrical outlets 46 throughout the residence 34.

As stated above, wiring in the residence as well as the various electrical appliances connected to the electrical outlets 46 operatively generate pick-up noise and high frequency noise, respectively, which, without device 10 and, specifically, without filter 44, would be coupled by the coupler/splitter 32 with the outgoing communication data, thereby resulting in a substantially decreased signal to noise ratio because a portion of the bandwidth will be occupied by the noise. As is known in the art, a decrease in the signal to noise ratio yields a decrease in the maximum data transfer rate attainable in transmissions to and from the terminal device 40. Such decrease in bandwidth degrades overall system performance, especially when transmitting data to a computer or television, as in digital television applications. Accordingly, the system 10 utilizes the low pass filter 44 as a bi-directional filter to block any high frequency noise that would otherwise be coupled to the outgoing communication data. Thus, as should be appreciated, placing the low pass filter 44 and the high pass filter 36 on the drop line 12 at the entry point to a residence 34 yields an increase in available bandwidth, thereby resulting in an increased data transfer rate and, specifically, a rate exceeding 6 Mbits/sec, as well as a decreased system installation time.

In the preferred embodiment, high pass filter 36 is implemented as a pair of capacitors selected for blocking low frequency components below 60 Hz while passing high frequency components. Also in the preferred embodiment, the receiver unit 38 and the transmitter unit 42 may be combined into a single unit, as is known in the art.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A device for use in a communication network for increasing a data transmission rate on a drop line having an entry point and containing a signal having low frequency power components and high frequency data components, said device comprising:

a splitter connected to the drop line for dividing the drop line into a first section and a second section with each said section containing both the low frequency power components and the high frequency data components;

a first filter connected to said first section for removing the low frequency power components therefrom while passing the high frequency data components through said first filter;

a receiver connected to said first filter for receiving said high frequency data components passed through said first filter for input to a terminal device; and a second filter connected to said second section for removing the high frequency data components from said second section while passing said low frequency power components through said second filter for use by appliances operatively generating high frequency noise, said second filter being positioned proximate the drop line entry point for blocking said high frequency noise and thus inhibiting said high frequency noise from reaching said drop line.

2. The device of claim 1, further comprising a coupler connected to said drop line.

3. The device of claim 2, wherein said coupler and said splitter comprise a single unit.

4. The device of claim 3, further comprising a transmitter connected to said single unit for providing high frequency data components to said drop line for use by the communication network.

5. The device of claim 2, further comprising a transmitter connected to said first filter for providing high frequency data components to said drop line for use by the communication network.

6. The device of claim 3, further comprising a transmitter connected to said first filter for providing high frequency data components to said drop line for use by the communication network.

7. The device of claim 4, wherein said transmitter and said receiver comprise a common unit.

8. A method for increasing the rate of data transmission on a drop line in a communication network, said drop line having an entry port and containing a signal having low frequency power components and high frequency data components, said method comprising the steps of:

dividing the drop line into a first section and a second section with each said section containing both the low frequency power components and the high frequency data components;

removing the low frequency power components from the first section while passing the high frequency data components;

receiving the high frequency data components passed in said removing step for input to a terminal device;

removing the high frequency data components from said second section while passing the low frequency power components for use by appliances operatively generating high frequency noise; and blocking, at a location proximate said entry port, the high frequency noise from said second section so as to avoid transferring the high frequency noise to the drop line.

9. The method of claim 8, wherein said step of removing the high frequency components and said step of blocking the high frequency noise comprise a single step.

10. The method of claim 8, further comprising the step providing, through a transmitter, high frequency data components to said drop line for transmission by the communication network.

* * * * *